N. BENINCASA.
PAY ON THE PLATFORM CAR.
APPLICATION FILED FEB. 12, 1910.
998,069.
Patented July 18, 1911.
2 SHEETS—SHEET 1.
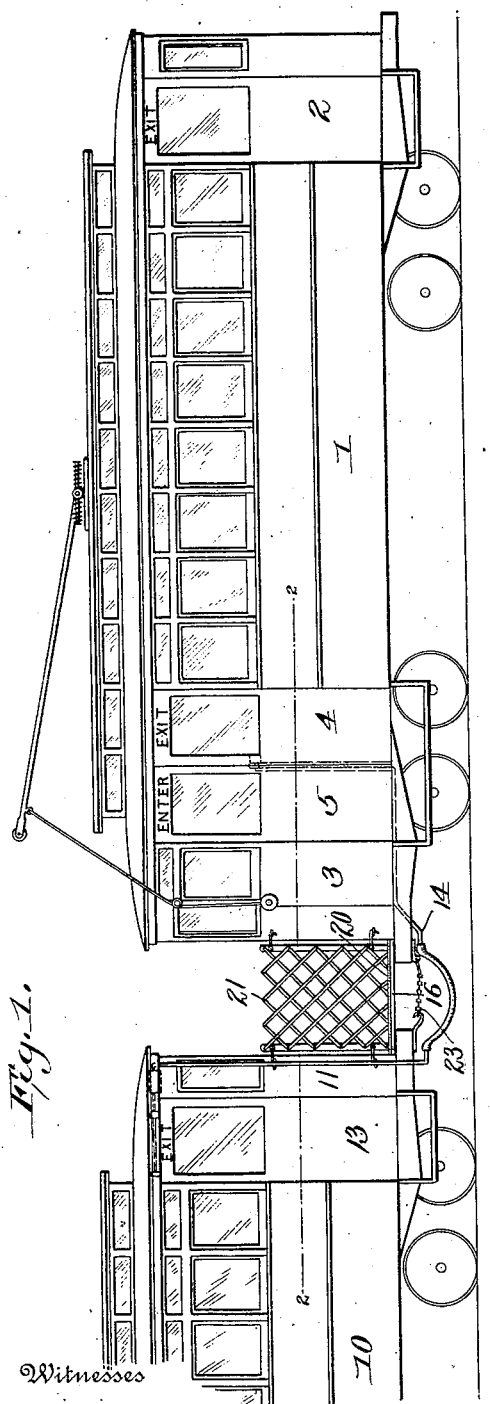
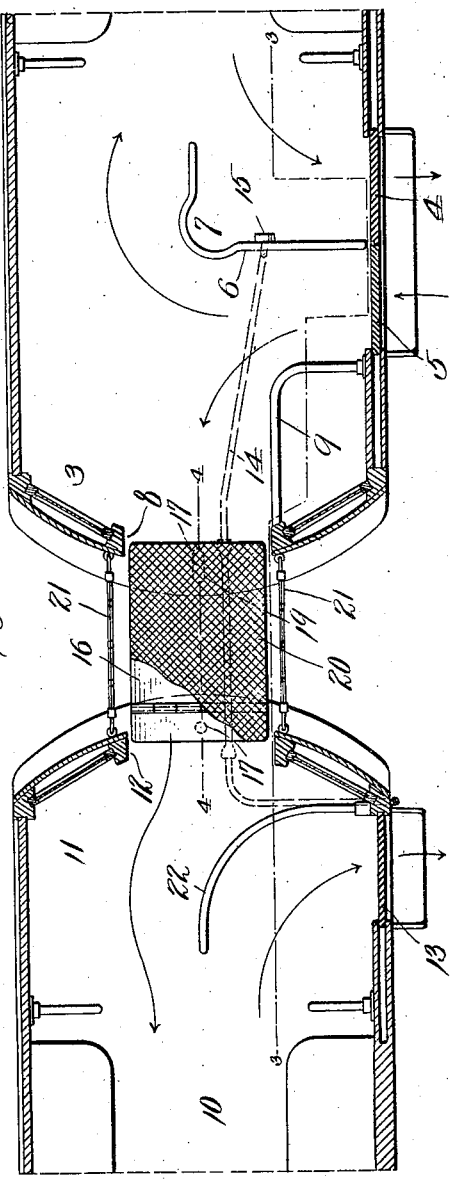
Inventor
Nicholas Benincasa N. BENINCASA.
PAY ON THE PLATFORM CAR.
APPLICATION FILED FEB. 12, 1910.
998,069.
Patented July 18, 1911.
2 SHEETS—SHEET 2.
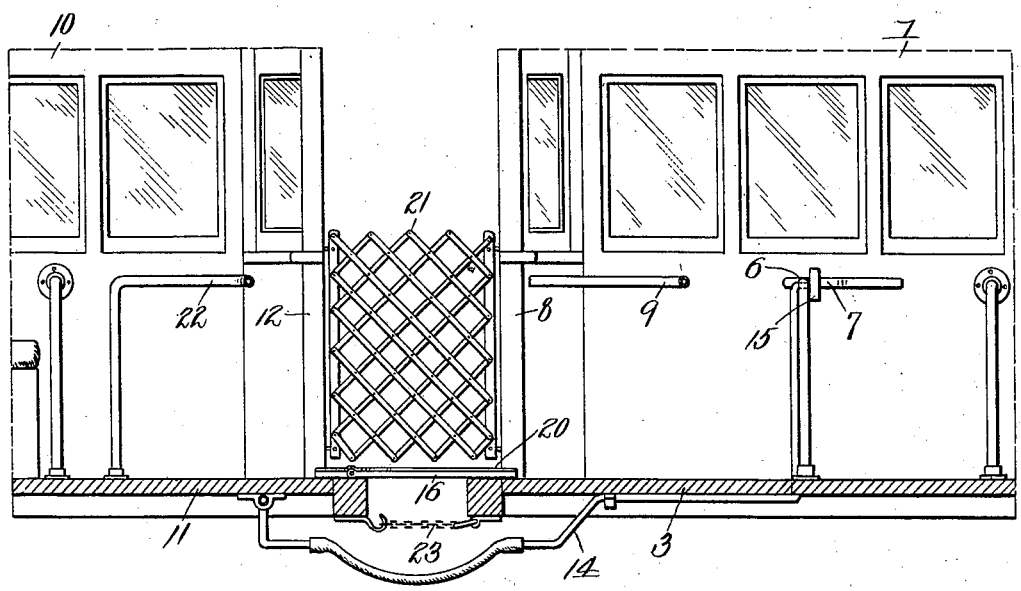
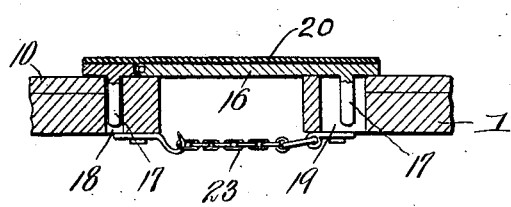
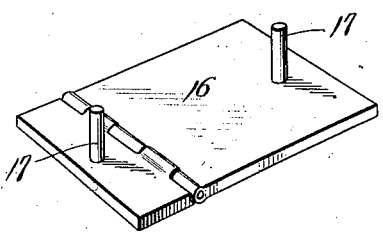
Witnesses
Inventor
Nicholas Benincasa
Attorney

UNITED STATES PATENT OFFICE.

NICHOLAS BENINCASA, OF PITTSBURG, PENNSYLVANIA.

PAY-ON-THE-PLATFORM CAR.

998,069. Specification of Letters Patent. Patented July 18, 1911.

Application filed February 12, 1910. Serial No. 543,512.

*To all whom it may concern:*

Be it known that I, NICHOLAS BENINCASA, a citizen of the United States, residing at East End Pittsburg, in the county of Allegheny and State of Pennsylvania, have invented a new and useful Improvement in Pay-on-the-Platform Cars, of which the following is a specification.

This invention relates to a pay-on-platform car, and the object of the invention is to enable one conductor to collect fares upon one platform provided with an entrance common to two cars, that is to a motor car and to a trailer.

Cars now commonly known by the name of pay on platform and pay as you enter have come into general use especially upon roads running large single cars. Many roads however run smaller cars, the rear car being usually termed a trailer and upon cars of this type it is necessary for the conductor to pass from one car to the other in order to collect fares, or owing to the inability of a conductor to properly look after passengers in two separate cars it is customary during seasons of heavy travel to employ a conductor for each car. When a single conductor is employed he fails to collect many fares due to the entrance of persons in one car while the conductor is upon the other and serious accidents very often occur by the starting of the cars when passengers are getting on or off the car not at that time in personal charge of the conductor. To avoid loss of fares and to more properly safeguard the passengers I purpose to adapt cars of this type to the pay on platform principle and in cars provided with my improvement passengers enter the cars only by way of the rear platform of the motor car upon which the conductor is stationed and leave the cars from either platform of the motor car or from the front platform of the trailer.

This invention can also be used in connection with pay-on-platform cars now in use, the trailer being used as a car for men only, or as a smoking car or as a combination baggage and smoking car.

My invention consists in the novel features of construction hereinafter fully described, pointed out in the claim and shown in the accompanying drawings in which, Figure 1 is a side elevation of a motor car and a portion of a trailer provided with my improvement. Fig. 2 is an enlarged horizontal section upon the line 2—2 of Fig. 1. Fig. 3 is a vertical section upon the irregular line 3—3 of Fig. 2. Fig. 4 is a vertical section upon the line 4—4 of Fig. 2. Fig. 5 is an inverted perspective view of a gangway.

In these drawings, 1 represents a motor car provided with an exit 2 at the front, and having a rear platform 3 provided upon one side with slidable doors 4 and 5, the door 4 being an exit and the door 5 being an entrance through which passengers may board the car. A suitable railing 6 extends transversely across the platform from a point where the doors 4 and 5 adjoin to a point adjacent the longitudinal center of the platform and then curves forwardly thus providing an inclosure 7 within which the conductor stands. A door-way 8 is also formed centrally and at the rear end of the platform and a curved guard rail 9 extends across the corner formed between the entrance door 5 and the door-way 8, said guard rail preventing passengers from crowding or standing in said corner and thereby blocking the passageway and also affording a hand support useful during the stopping or starting of the car. A trailer 10 is provided with a platform 11 and a central door-way 12 which alines with the door-way 8. The platform 11 is also provided with an exit normally closed by a door 13. The doors 2, 4 and 5 are usually operated by the motorman and the conductor, but as there is neither motorman nor conductor upon the trailer I purpose to employ compressed air for the purpose of opening and closing the door 13, the air being obtained from the air brake system now in common use upon street cars. I therefore extend from any desirable point of the said air brake system a compressed air pipe 14 to said door, the said pipe having the usual flexible connection between the cars, and being provided with any suitable valve mechanism 15, arranged at a point convenient for operation by the conductor. I do not claim any special construction of door operating means, nor any particular type of valve, as the same does not form a part of this invention.

To connect the door-ways 8 and 12 I provide a gangway 16 formed in two sections which are hinged together as shown in the drawings, thereby allowing for slight vertical play. This gangway rests upon the car bumpers and to secure the same in place and at the same time to permit the necessary play upon curves I provide pins 17, one for each section of the gangway, which pins extend downwardly and rest respectively in a socket 18 formed in the bumper of the trailer 10 and in a slot 19 cut in the bumper of the motor car 1.

The slot 19 permits the swinging of the motor car at an angle to the trailer and also with reference to the gangway in rounding curves. To insure the safety of passengers using said gangway I prefer to cover the same with a mat 20, of rubber or other suitable material and I also place upon opposite sides of the gangway a lattice work 21, said lattice work being constructed of lazy tongs so that it can extend or contract as the cars pass on or off curved portions of the track.

In order to prevent any confusion arising from passengers entering and leaving the trailer at the same time I place a curved guard rail 22 upon the platform 11, which guard rail separates the entrance through the door-way 12 from the exit passage leading to the door 13. The cars may be coupled together by a chain 23, or by any other suitable form of coupling.

What I claim is:—

In a car train of the kind described, a front car having a rear pay-on-entering-platform, entrance and exit doors at the side of said platform, a curved guard rail arranged between said doors and forming an exit passage for persons occupying the front car, a door-way at the end of said platform, a trailer having an exit-way upon the front platform and having an entrance-way at the front end of the said platform, said entrance-way being in alinement with the end door-way of the first mentioned platform, a gang-way connecting the two platforms, and an inwardly and rearwardly curved guard rail upon the front platform of the trailer separating the exit from said platform from the entrance-way communicating with the rear platform of the front car.

NICHOLAS BENINCASA.

Witnesses:
W. A. ROBINSON,
H. C. DODGSON.

Copies of this patent may be obtained for five cents each, by addressing the "Commissioner of Patents, Washington, D. C."